May 17, 1932.  C. B. WOODWORTH  1,858,569
PROTECTIVE COVERING FOR AUTOMOBILE BUMPERS
Filed June 26, 1930
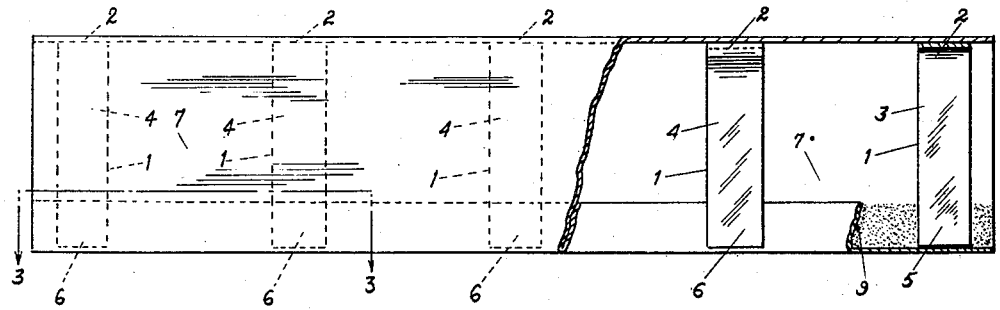
Fig.1.
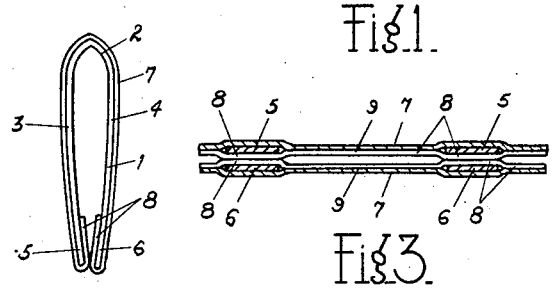
Fig.3.
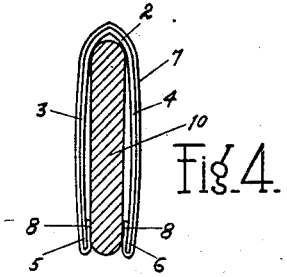
Fig.4.
Fig.2.
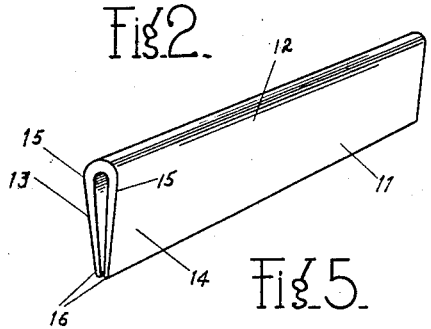
Fig.5.
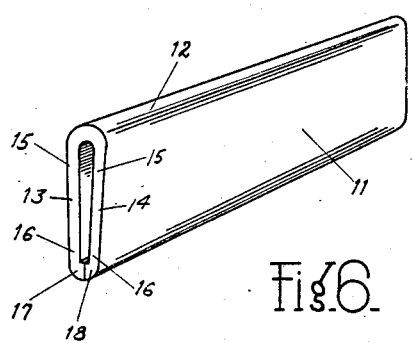
Fig.6.
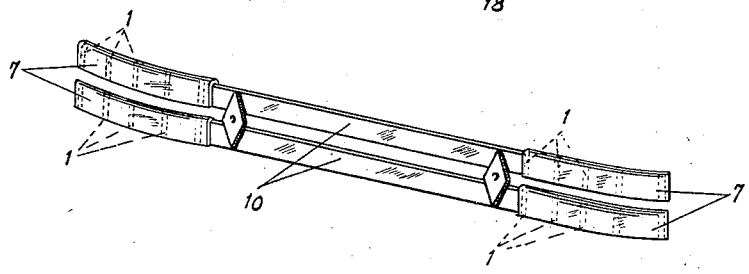
Fig.7.
INVENTOR.
CHARLES B. WOODWORTH.
BY
ATTORNEY.

Patented May 17, 1932

1,858,569

UNITED STATES PATENT OFFICE

CHARLES B. WOODWORTH, OF PORT DICKINSON, NEW YORK

PROTECTIVE COVERING FOR AUTOMOBILE BUMPERS

Application filed June 26, 1930. Serial No. 463,938.

It has long been a problem to motorists and car owners to protect the outer opposite ends of their automobile bumpers from the viscous sticky tar or other material frequently used to cover roads. As the car is driven over roads which are covered with tar or similar substances, or muddy roads, the momentum of the wheels throws the same onto the ends of the bumpers where because of its adhesive qualities, it becomes firmly lodged thereon. This nuisance is not only unsightly and generally detracting from the appearance of the car, but also proves exceedingly annoying when it is desired to wash the vehicle, for as mentioned above, the tar is very difficult to remove.

Many car owners have used makeshift contrivances such as pieces of old inner tubes, etc. stretched over the ends of the bumpers for solving this problem, such devices however generally resulting in disfiguring the car's appearance.

My primary object therefore, has been to provide a device for eliminating the foregoing disadvantages and which, when mounted on the bumper, enhances the appearance of the car.

Another feature and advantage of my invention is that it flexibly adapts itself to any curvature of a wide variety of bumpers.

Still another advantage is that my protector separately and independently covers the individual bumper bars obviously not defacing the intended design of parallel bumper bars, and may be quickly and easily slipped on or off of same.

A further object of my invention is to provide a device of this character which is inexpensive to manufacture, durable, and will stand repeated cleanings, of which, if the user so desires may be discarded after much use and be replaced easily and conveniently with little expense.

Other objects and advantages in details of construction and operation will be apparent as the description proceeds, reference now being had to the figures of the accompanying drawings forming a part of this application, wherein like reference numerals indicate like parts.

In the drawings:—

Figure 1 is a side view of my improved bumper cover, certain parts being broken away for clearness.

Figure 2 is an end view of same.

Figure 3 is a sectional view taken on the line 3—3 of Figure 1, showing the method of fastening the covering material to the body structure.

Figure 4 is an end view of the device in position on the bumper.

Figure 5 is a modified form of my invention.

Figure 6 is also a modified form of my invention.

Figure 7 is a perspective view of a pair of parallel bumper bars with my improved covers mounted thereon.

My invention essentially comprises a plurality of spring clips 1 formed preferably of flat spring stock or other suitable material and resiliently tempered, said clips being bent or otherwise suitably formed as at 2 to provide downwardly extending inclined side gripping members 3 and 4 which are slightly longer in depth than a standard sized bumper bar. The bend 2 tends to force inwardly against one another, the lower free ends of said clips as indicated at 5 and 6. These clips 1 are arranged equally and a relatively small distance apart within a rectangular piece of leather preferably of a dark color, or other suitable pliable covering material which is adapted to completely overlap the same. The lower free ends of this covering material 7 extend beyond the lower ends 5 and 6 of the spring clips 1 thereby serving as flaps which are adapted to be turned upwardly inside and between said ends as at 8 as clearly shown in Figures 2 and 4. These inwardly turned flaps 8 are rigidly secured around the lower ends 5 and 6 of the clips 1 to the innerside of the covering material 7 as at 9 by gluing, cementing or other suitable fastening means. It will be obvious that by this construction, the clips 1 are securely fastened to but flexibly cooperative with the covering material 7, and therefore are readily adaptable for use on curved bumper bars.

Referring to Figures 4 and 7 wherein is illustrated the device mounted on bumper bars indicated by the reference numeral 10, it will be seen that the spring clips 1 are placed downwardly over said bars and are rigidly and frictionally held by the ends 5 and 6 of same, which firmly press thereagainst. It will be noted with particular reference to Figure 7, that the material 7 completely envelopes the sides and upper edges of the bars 10 obviously protecting same from any foreign substance which might be thrown thereon.

One modified form of my invention clearly shown in Figure 5 consists of a relatively long piece of rubber 11 or other suitable flexible and resilient material formed similar to the previously described clips 1, with a bend 12 and downwardly extending and inclined side members 13 and 14 bellied as at 15 to exert inward pressure upon the lower free ends 16 which are adapted to frictionally and firmly engage the bumper bars 10. The inherent resiliency of the covering serves to hold it in place on the bumper bar.

The other modified form of my invention shown in Figure 6 incorporates all of the foregoing construction plus the addition of inwardly and abutting lips 17 and 18 extending longitudinally along and integrally formed with the lower edges 16 of same. In placing this form of my device on the bars 10, the user merely spreads the lips 17 and 18 far enough apart to be slidably forced downwardly thereover. Obviously, this labiated form of my device locks same securely on the bumper bars 10. It will be clear that these lips 17 and 18 will abut against each other as clearly shown in Figure 6 and adjacent the lower edge of the bumper bar 10. In the forms shown in Figures 5 and 6, it will be understood of course that they may, if desired, be glued or otherwise securely fixed to the bumper bars.

It is evident from the foregoing that I have provided a unique and attractive protective cover for automobile bumpers adapted to be easily and quickly slipped on or off of same, and which by virtue of its flexible design is readily adaptable to various sizes and shapes of bumpers. It is also apparent that the simplicity of construction tends to reduce the cost of such an article.

Of course, many changes may be made in the arrangement of parts and the material used without departing from the spirit and scope of my invention. I do not limit myself, therefore, to the exact form herein shown and described, other than by the appended claims.

I claim:

1. A protective covering for the ends of bumper bars comprising an elongated sheath provided with elastic means for tightly engaging around said ends.

2. A protective covering for the ends of bumper bars comprising a plurality of spring clips and an elongated sheath secured to and holding said clips in spaced relation whereby to provide an elastic and flexible covering for said ends.

In testimony whereof, I affix my signature.

CHARLES B. WOODWORTH.